United States Patent
Jehle et al.

(10) Patent No.: US 10,962,104 B2
(45) Date of Patent: Mar. 30, 2021

(54) METHOD AND CONTROL UNIT FOR OPERATING A TRANSMISSION

(71) Applicant: ZF Friedrichshafen AG, Friedrichshafen (DE)

(72) Inventors: Martina Jehle, Kressbronn (DE); Andreas Schmidt, Bavendorf (DE); Angelique Schwimmer, Friedrichshafen (DE); Christian Pannek, Friedrichshafen (DE); Daniel Zerlaut, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/701,325

(22) Filed: Dec. 3, 2019

(65) Prior Publication Data
US 2020/0173543 A1    Jun. 4, 2020

(30) Foreign Application Priority Data

Dec. 3, 2018    (DE) ...................... 10 2018 220 868.9

(51) Int. Cl.
*F16H 61/02*    (2006.01)
*F16H 61/16*    (2006.01)

(52) U.S. Cl.
CPC ......... *F16H 61/0265* (2013.01); *F16H 61/16* (2013.01); *F16H 2200/0065* (2013.01);
(Continued)

(58) Field of Classification Search
CPC ................. F16H 61/0265; F16H 61/16; F16H 2200/0065; F16H 2710/20;
(Continued)

(56) References Cited

U.S. PATENT DOCUMENTS

| 7,789,792 | B2 | 9/2010 | Kamm et al. |
| 8,398,522 | B2 | 3/2013 | Bauknecht et al. |

(Continued)

FOREIGN PATENT DOCUMENTS

| DE | 102005002337 A1 | 8/2006 |
| DE | 102008000429 A1 | 9/2009 |
| DE | 102013222381 A1 | 5/2015 |

OTHER PUBLICATIONS

German Search Report DE102018220868.9, dated Sep. 5, 2019. (12 pages).

*Primary Examiner* — Justin Holmes
(74) *Attorney, Agent, or Firm* — Dority & Manning, P.A.

(57) ABSTRACT

A method for operating a transmission (3) is provided, which includes a hydraulic pump drivable on a transmission-input end and at least one form-locking shift element (A, F). One of the shift-element halves is displaceable between a first end position and a second end position with a hydraulic pressure of the hydraulic pump. The current position of the shift-element half is detected with a sensor and is stored as a specified end-position value if the shift-element half is located in one of the end positions, the hydraulic pump is driven, and the shift-element half is actuated, with the hydraulic pressure, towards the current end position. When the hydraulic pressure is less than a threshold value, a deviation is determined between the current position of the shift-element half and the specified end-position value. The hydraulic pressure is increased when the deviation is greater than a threshold value.

10 Claims, 4 Drawing Sheets

(52) U.S. Cl.
CPC ........... *F16H 2200/2012* (2013.01); *F16H 2200/2046* (2013.01); *F16H 2708/20* (2013.01); *F16H 2710/04* (2013.01); *F16H 2710/20* (2013.01)

(58) Field of Classification Search
CPC ......... F16H 2200/2046; F16H 2710/04; F16H 2708/20; F16H 2200/2012; F16H 61/686; F16H 61/0204; F16H 61/0025; F16H 2059/6823; F16H 59/68; F16H 63/42; F16H 61/40
See application file for complete search history.

(56) References Cited

U.S. PATENT DOCUMENTS

| | | | |
|---|---|---|---|
| 9,625,032 B2 | 4/2017 | Maurer et al. | |
| 2009/0242345 A1* | 10/2009 | Nakagawara | F16D 48/066 192/3.58 |
| 2010/0081547 A1* | 4/2010 | Kobayashi | F16H 61/688 477/156 |
| 2015/0133252 A1* | 5/2015 | Mihatsch | F16H 61/061 475/86 |

* cited by examiner

Fig. 4a  Fig. 4b  Fig. 4c
Fig. 4d  Fig. 4e  Fig. 4f

METHOD AND CONTROL UNIT FOR OPERATING A TRANSMISSION

CROSS-REFERENCE TO RELATED APPLICATION

The present application is related and has right of priority to German Patent Application No. 10 2018 220 868.9 filed on Dec. 3, 2018, the entirety of which is incorporated by reference for all purposes.

FIELD OF THE INVENTION

The invention relates generally to a method for operating a transmission. Moreover, the invention relates generally to a control unit for carrying out the method as well as to a corresponding computer program product.

BACKGROUND

DE 10 2005 002 337 A1 describes an eight-speed multi-stage transmission that includes friction-locking shift elements. The shift elements are multi-disk clutches or multi-disk brakes. In the presence of a shift request for a ratio change in the transmission, at least one of the friction-locking shift elements is to be disengaged from the power flow of the transmission device and at least one further friction-locking shift element is to be engaged into the power flow of the transmission device, in order to transmit a torque.

In general, in the presence of a demand to disengage a friction-locking shift element, regardless of the torque presently transmitted via the friction-locking shift element, it is assumed that the friction-locking shift element is actually transitioning into the disengaged operating condition. To the same extent, a demand to engage a friction-locking shift element is also implementable using comparatively little outlay for open-loop and closed-loop control.

For this reason, a simple software-based evaluation of an actuating current of a pressure regulator of a friction-locking shift element is sufficient. During the determination of an appropriate disengagement control signal or an appropriate engagement control signal for transferring the friction-locking shift element into its disengaged operating condition or its engaged operating condition, respectively, it can be easily verified whether a shift change or gearchange was successful via such an evaluation.

Disadvantageously, however, friction-locking shift elements in the disengaged operating condition cause drag torques, which adversely affect an overall efficiency of an automatic transmission to an undesirable extent.

For this reason, transmission devices, such as those described in DE 10 2008 000 429 A1, increasingly include not only friction-locking shift elements but also form-locking shift elements. These types of form-locking shift elements usually include two shift-element halves. The shift-element halves are brought into form-locking engagement with each other via axial displacement of at least one movable shift-element half with respect to the other shift-element half, which is not to be axially displaceable, at dog elements, or the like. Thereupon, the form-locking shift element is engaged and transmits an applied torque. Moreover, it is also possible that both shift-element halves are axially movable with respect to each other.

If the form-locking shift element is to be disengaged from the power flow, the positive engagement between the shift-element halves is disengaged via axial displacement of the movable shift-element half with respect to the axially fixed shift-element half. Form-locking shift elements are used because, in contrast to friction-locking shift elements, essentially no drag torques occur with disengaged form-locking shift elements. Drag torques adversely affect the overall efficiency of a transmission. However, form-locking shift elements, as compared to friction-locking shift elements, are transferable out of a disengaged operating condition, in which no torque is transmitted via the form-locking shift elements, into their engaged operating condition only close to their synchronous speed.

Additionally, form-locking shift elements engaged into the power flow of a transmission device are disengageable from the power flow or transferable into their disengaged operating condition using low shifting forces if the applied torque has an appropriately low value. During gear change operations or gear disengagement operations, a power flow between a transmission input shaft and a transmission output shaft is to be interrupted in the transmission. In this case, a form-locking shift element is to be transferred, if necessary, from its engaged operating condition into its disengaged operating condition. Due to an excessively rapid or faulty build-up of the torque applied at the form-locking shift element, or due to a faulty reduction of the applied torque, the form-locking shift element may not be transferrable into its disengaged operating condition. In addition, it is also possible that mechanical, hydraulic, or electrical malfunctions prevent the disengagement of a form-locking shift element. For this reason, form-locking shift elements, in contrast to friction-locking shift elements, do not necessarily transition into a disengaged operating condition in the presence of an appropriate disengagement control signal.

Additionally, it is also possible that a disengaged form-locking shift element is not transferable into its engaged operating condition within desirably short operating times. This is the case, for example, when the sought positive engagement between the shift-element halves cannot be established due to an out of mesh or tooth-on-tooth position. In the event of such an out of mesh position, dog elements of the shift-element halves rest against one another at their end faces and the differential speed between the shift-element halves is zero. Such an out of mesh position is released only when a torque present at the form-locking shift element is greater than the static friction torque between the end faces of the dog elements of the shift-element halves.

Moreover, the establishment of a complete positive engagement between the shift-element halves or the complete engagement of a form-locking shift element is also preventable by a flank jamming or flank clamping between the flanks of the dog elements. In the event of such a flank jamming, the two shift element halves have an axial overlap of their dog elements. However, the static friction between the flanks of the dog elements of the shift-element halves, which are resting against one another, is so high that the engagement force acting on the shift elements in the engagement direction is not sufficient to overcome the static friction and completely engage the form-locking shift element.

Usually, transmissions including hydraulically actuated, form-locking shift elements include a hydraulic pump, which is arranged on the transmission-input end or on the transmission-output end. Such a hydraulic pump is driven, as is known, starting from a transmission input shaft, with the torque of a prime mover of a vehicle drive train operatively connected to the transmission input shaft and provides a hydraulic fluid necessary for supplying the transmission. If the prime mover is switched off, the hydraulic pressure made available by the hydraulic pump drops to zero. This means, the actuating pressure of the shift elements of a transmission is also reduced and a current operating condition of the transmission may not be maintainable to the demanded extent during unfavorable operating conditions.

If such a transmission does not include hydraulic protection in the form of a hydraulic accumulator or an electrical auxiliary pump, it is possible that, in particular, form-locking shift elements disengage to an undesirable extent or transition into an engaged operating condition.

Sensors are installed in order to be able to monitor the current operating condition of a form-locking shift element. These sensors include, for example, a permanent magnet and a measuring unit for sensing the magnetic field of the permanent magnet. Additionally, the sensors have a ferromagnetic sensor contour, which influences the magnetic field of the permanent magnet depending on the operating conditions of the shift-element halves. Various magnetic field-sensing elements are known, such magnetoresistive sensors or Hall effect sensors. Magnetic field sensors generally include elements sensing a magnetic field or other electronic components, wherein some magnetic field sensors include permanent magnets in a back-biased arrangement.

These types of magnetic field sensors provide electrical signals, which represent the condition of a sensed magnetic field. Some magnetic field sensors cooperate with ferromagnetic objects. With the aid of the magnetic field sensors, magnetic field fluctuations are determined, which are caused by an object moved through the magnetic field of a magnet of a magnetic field sensor. The magnetic field monitored with the aid of the magnetic field sensor also varies, as is known, depending on a shape or a profile of the moving ferromagnetic object. The position determination of the shift-element halves is calculated directly from the raw signals of the sensors with the aid of applicable thresholds.

The values of the sensor signal have a non-negligible scattering, which does not allow for a precise determination of a current dog position. For this reason, a value range of the sensor signal is utilized in each case for the determination, by the sensor, of a current dog position, which is delimited for the relevant dog position by the particular maximum sensor signal that has been received and by the minimum sensor signal that has been received. Additionally, the values of the signal of such a sensor also vary depending on a position change of the overall form-locking shift element of a transmission with respect to the sensor. Such a position change results from gear play, which varies depending on the particular torque to be transmitted via the transmission and depending on manufacturing tolerances of the transmission and of the form-locking shift element.

SUMMARY OF THE INVENTION

Starting from the above-described background, example aspects of the invention provide a method for operating a transmission, with the aid of which an unintentional disengagement of a form-locking shift element can be detected as early as possible, in order to be able to initiate suitable countermeasures. Additionally, a control unit, which is designed for carrying out the method, and a computer program for carrying out the method are provided.

A method for operating a transmission is provided, which includes a hydraulic pump drivable on the transmission-input end and at least one form-locking shift element.

The shift element includes two shift-element halves, which can be brought into engagement with each other in a form-locking manner. At least one of the shift-element halves is displaceable between a first end position, which corresponds to an engaged operating condition of the shift element, and a second end position with the aid of a hydraulic pressure of the hydraulic pump. The second end position corresponds to a disengaged operating condition of the shift element. The current position of the moveable shift-element half is monitored with a sensor.

In the present case, for example, constant-mesh shift elements or dog clutches, which transmit a torque via a form-locking connection, are described herein under the term "form-locking shift element". Moreover, shift elements which transmit a torque via a friction-locking connection, clutches or brakes, are described herein under the term "friction-locking shift element". The torque transmittable with the aid of such a friction-locking shift element varies depending on the particular engagement force applied to the friction-locking shift element and is preferably infinitely variable. The engagement force corresponds, for example, to a hydraulic pressure applied to the shift element. In contrast thereto, the torque transmittable with the aid of a form-locking shift element is not infinitely variable.

During the monitoring of the current position of the shift-element half, it is possible that so-called reference values of the sensor are determined. In the present case, the term "reference values of a sensor" is understood to mean values of a sensor signal that correspond to a current operating condition of a form-locking shift element. In particular, these are the sensor values that are determined, by the sensor, in the end positions of a movable shift-element half, whose axial actuating movement is monitored with the aid of the sensor. The two end positions of a movable shift-element half correspond, in turn, to a completely engaged operating condition and to a completely disengaged operating condition of a form-locking shift element.

Example aspects of the invention disclose that the current position of the shift-element half is determined and is stored as a specified end-position value. The latter approach is carried out if the shift-element half is located in one of the end positions, the hydraulic pump is driven, and the shift-element half is actuated, with the aid of the hydraulic pressure, in the direction of the current end position. Additionally, in the presence of a hydraulic pressure less than a threshold value, a deviation is determined between the current position of the shift-element half and the specified end-position value. Additionally, the hydraulic pressure is increased in the presence of a deviation greater than a threshold value.

The threshold value of the hydraulic fluid corresponds to a pressure value, below which a probability that the form-locking shift element unintentionally transitions into its disengaged operating condition or into its engaged operating condition is very high and the transmission transitions into an undefined operating condition.

Moreover, the threshold value of the deviation represents a limiting value, above which there is just enough time to prevent the shift element from engaging in the undesirable automatic operating condition change into its disengaged operating condition or into its engaged operating condition, with the aid of appropriate countermeasures.

In other words, with the aid of the approach according to example aspects of the invention, the current position of the shift-element half of the form-locking shift element is initially preferably cyclically determined and stored as a start value. This is carried out for as long as the hydraulic pressure of the hydraulic pump is sufficient for holding the form-locking shift element in the demanded operating condition, i.e., disengaged or engaged, or to hold the shift-element half in the end position corresponding thereto. If, for example, a prime mover of a vehicle drive train designed including the transmission is switched off and, thereafter, the hydraulic pressure of the hydraulic pump decreases, the specified end-position value is not further determined. Thereafter, the actual position of the movable shift-element half of the form-locking shift element is continuously determined and compared to the last determined and stored specified end-position value. If the difference between the actual position and the specified end-position value exceeds the threshold value, an unintentional operating condition change between the disengaged operating condition and the engaged operating condition, or vice versa, is detected.

Based on this knowledge, suitable countermeasures can be implemented, with little outlay, in order to prevent or counteract the undesirable operating condition change.

In an advantageous example variant of the method according to the invention, the hydraulic pressure is increased by raising the drive torque of the hydraulic pump if an undesirable operating condition change of the form-locking shift element is detected. Therefore, it can be ensured, in a simple way, that the shift-element half is transferred into the demanded end position again.

The drive torque of the hydraulic pump may be raised by engaging a prime mover of a vehicle drive train designed including the transmission. This can be implemented, for example, with little outlay, into an existing engine start-stop application.

In a further advantageous example variant of the method according to the invention, a check is carried out to determine whether the hydraulic pressure is greater than the threshold value after the drive torque of the hydraulic pump has been raised, whether a differential speed between the shift-element halves is zero, and whether the shift-element half is moved in the direction of the demanded end position. In the case of a positive test result, the current hydraulic pressure is further applied to the shift-element half and the form-locking shift element is transferred into the demanded operating condition and held there.

This means, the countermeasure preventing the undesirable operating condition change was triggered already during an existing positive engagement between the shift-element halves and prevents the undesirable operating condition change of the form-locking shift element.

In a further example variant of the method according to the invention, the differential speed between the shift-element halves is guided to values within a differential speed range, within which the positive engagement between the shift-element halves can be established. This takes place for the case in which the differential speed is greater than a limiting value upon determination of a value of the hydraulic pressure above the threshold value.

This approach offers the possibility of transferring the form-locking shift element into its engaged operating condition to the demanded extent again if the positive engagement of the form-locking shift element has been released due to a late actuation of the shift element.

In a further advantageous example variant of the method according to the invention, the hydraulic pressure is reduced and/or a torque present at the shift element is increased if an out of mesh or tooth-on-tooth position is detected and a value of the hydraulic pressure is greater than the threshold value. Therefore, an engaged operating condition of the form-locking shift element is established, in a simple way, within short operating times.

Additionally, in the presence of a hydraulic pressure greater than the threshold value and upon detection of a flank jamming, the hydraulic pressure is increased and/or a torque present at the shift element is reduced. This approach offers the advantage of transferring the form-locking shift element into the demanded engaged operating condition or into the disengaged operating condition within short operating times.

If it should be detected, after a predefined time period has elapsed, that the shift-element half is not in the demanded end position, a power flow in the transmission is interrupted, in a further example variant of the method according to the invention.

Alternatively, the form-locking shift element may be transferred, by establishing an operating condition of the transmission, into an operating condition that is unloaded in such a way that the form-locking shift element can be transferred into its disengaged operating condition or into its engaged operating condition as demanded. For this purpose, for example, a ratio may be engaged in the transmission, for the implementation of which the form-locking shift element is not located in the power flow of the transmission and an engagement of the form-locking shift element also does not cause a preloading of the transmission.

Alternatively as well, depending on the particular current application, a ratio may be engaged in the transmission if it is detected that the form-locking shift element cannot be transferred into its engaged operating condition. The latter-mentioned ratio represents a gear step, for the implementation of which the form-locking shift element does not need to be in the engaged operating condition. Additionally, it is possible that this approach triggers the start of a diagnostic function, in order to be able to check a faulty operating condition of the form-locking shift element.

The invention also relates generally to a control unit, which is designed for carrying out the method according to example aspects of the invention. The control unit includes, for example, means utilized for carrying out the method according to the invention. These means can be hardware-related means and software-related means. The hardware-related means of the control unit or of the control device are, for example, data interfaces for exchanging data with the assemblies of the vehicle drive train contributing to the carrying-out of the method according to example aspects of the invention. Further hardware-related means are, for example, a memory for data storage and a processor for data processing. Software-related means can be, inter alia, program modules for carrying out the method according to example aspects of the invention.

In order to carry out the method according to example aspects of the invention, the control unit can be operated using at least one receive interface, which is designed for receiving signals from signal transmitters. The signal transmitters can be designed, for example, as sensors, which gather measured quantities and transmit them to the control unit. A signal transmitter can also be referred to as a signal pickup. In this way, the receive interface can receive a signal from a signal transmitter, via which it is signaled that a shift element of a transmission is to be monitored.

The control unit can also include a data processing unit, in order to evaluate and/or process the received input signals or the information of the received input signals.

The control unit can also be designed including a transmit interface, which is designed for outputting control signals to actuating elements. An actuating element is understood to be actuators that implement the commands of the control unit. The actuators can be designed, for example, as electromagnetic valves.

With the aid of the control unit, a transmission can be operated, which includes a hydraulic pump drivable on the transmission-input end and at least one form-locking shift element. The form-locking shift element includes two shift-element halves, which can be brought into engagement with one another in a form-locking manner. At least one of the shift-element halves is displaceable between a first end position, which corresponds to an engaged operating condition of the shift element, and a second end position with the aid of a hydraulic pressure of the hydraulic pump. The second end position corresponds to a disengaged operating condition of the shift element. During the operation of the transmission, the control unit determines, on the basis of detected input signals, that a current position of the shift-element half is to be monitored with the aid of a sensor and triggers an appropriate monitoring.

Moreover, the control unit is designed in such a way that the current position of the shift-element half is determined and is stored as a specified end-position value. This takes place if the shift-element half is located in one of the end positions, the hydraulic pump is driven, and the shift-element half is actuated, with the aid of the hydraulic pressure, in the direction of the current end position. If, in the presence of a hydraulic pressure less than a threshold value, the control unit determines a deviation between the current position of the shift-element half and the specified end-position value, the control unit outputs a demand, in the presence of a deviation greater than a threshold value, according to which the hydraulic pressure is increased.

With the aid of the control unit, an undesirable operating condition change of the form-locking shift element is detected as early as possible and a countermeasure counteracting the undesirable operating condition change is triggered. Therefore, undesirable operating conditions of a transmission are very likely avoided.

The aforementioned signals are to be considered merely as examples and are not to limit the invention. The gathered input signals and the output control signals can be transmitted via a vehicle bus, for example, via a CAN-BUS. The control device or the control unit can be designed, for example, as a central electronic control unit of the vehicle drive train or as an electronic transmission control unit.

The approach according to example aspects of the invention can also be embodied as a computer program product, which, when running on a processor of a control device, instructs the processor from the software point of view to carry out the assigned method steps, which are subjects of the invention. In this context, a machine-readable medium, on which an above-described computer program product is retrievably stored, is also a subject of the invention.

The invention is not limited to the specified combination of features of the independent claims or the claims dependent thereon. In addition, possibilities arise to combine individual features with one another, provided they arise from the claims, the following description of embodiments, or directly from the drawing. References in the claims to the drawings via the use of reference characters is not intended to limit the scope of protection of the claims.

BRIEF DESCRIPTION OF THE DRAWINGS

Preferred refinements result from the dependent claims and the following description. An exemplary embodiment of the invention is explained in greater detail with reference to the drawing, without being limited thereto. Wherein:

FIG. 6 shows a progression of the signal of a sensor, which is associated with the form-locking shift element according to FIG. 3a or according to FIG. 4a.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
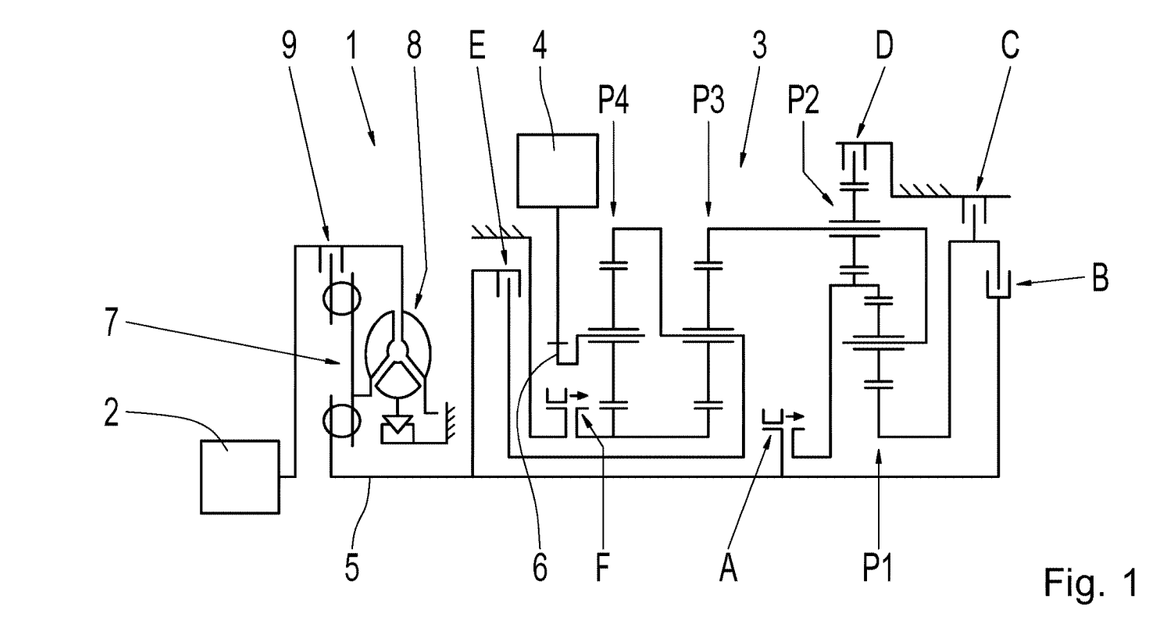
FIG. 1 shows a schematic of a vehicle drive train including a prime mover, a transmission, and a driven end.

FIG. 1 shows a schematic of a vehicle drive train 1 including a prime mover 2, a transmission 3, and a driven end 4. The prime mover 2 is an internal combustion engine in this case. The transmission 3 is an automatic transmission, in which multiple gears "1" through "9" for forward travel and at least one gear "R" for travel in reverse are implementable. Depending on the particular configuration of the vehicle drive train 1, the driven end 4 includes one, two, or more drivable vehicle axles, to which the torque of the prime mover 2 is applicable via the transmission 3. The transmission 3 includes a first hydraulically actuatable shift element A, a second hydraulically actuatable shift element B, a third hydraulically actuatable shift element C, a fourth hydraulically actuatable shift element D, a fifth hydraulically actuatable shift element E, and a sixth hydraulically actuatable shift element F. Hydraulically actuatable shift elements A through F are actuated during a ratio change in the transmission 3, i.e., during upshifts or downshifts. The ratio changes are to be carried out essentially without an interruption of tractive force, in combination with a high level of ride comfort and at a desired level of performance. The term "performance" is understood to mean, in each case, a ratio change in the transmission 3 that is implemented within a defined operating time.

In order to be able to carry out the particular demanded gear shift to the desired extent, shift elements A through F are each acted upon by shift sequences stored in a transmission control unit and a shift pressure corresponding to the particular shift sequence.

The transmission 3 includes a transmission input shaft 5 and a transmission output shaft 6. The transmission output shaft 6 is connected to the driven end 4. In the present case, a torsion damper 7 and, as a starting component, a hydrodynamic torque converter 8 including an associated torque converter lockup clutch 9 are arranged between the transmission input shaft 5 and the prime mover 2.

In addition, the transmission 3 comprises four planetary gear sets P1 through P4, in particular a first planetary gear set P1, a second planetary gear set P2, a third planetary gear set P3, and a fourth planetary gear set P4. The first planetary gear set P1 and the second planetary gear set P2, which are preferably designed as minus planetary gear sets, form a shiftable front-mounted gear set. The third planetary gear set P3 and the fourth planetary gear set P4 represent a main gear set. The shift elements C, D, and F of the transmission 3 are brakes, while the shift elements A, B, and E represent separating clutches.

Figure 2:
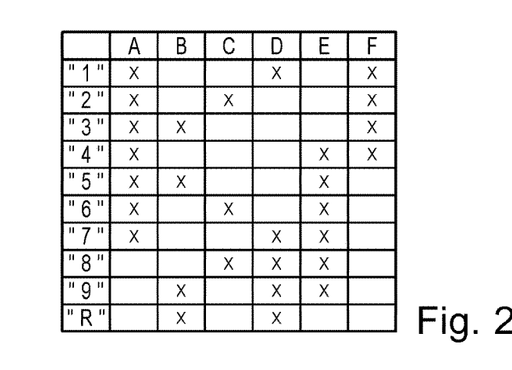
FIG. 2 shows a shift logic, in table form, of the transmission shown in FIG. 1.

A selective shifting of the gear stages "1" through "R" can be implemented with the aid of the shift elements A through F according to the shift logic represented in greater detail in FIG. 2. In order to establish a power flow in the transmission, essentially three of the shift elements A through F are to be transferred into or held in an engaged operating condition essentially simultaneously in each case.

The shift elements A and F are designed, in this case, as form-locking shift elements without additional synchronization. As a result, in the case of the transmission 3, as compared to transmissions including only friction-locking shift elements, drag torques caused by disengaged friction-locking shift elements are reduced.

As is known, form-locking shift elements are generally transferable out of a disengaged operating condition into an engaged operating condition only within a very narrow differential speed range, encompassing the synchronous speed, between the shift-element halves to be brought into an operative connection with one another in a form-locking manner. If the synchronization of a form-locking shift element to be engaged cannot be carried out with the aid of additional structural embodiments, the synchronization is implemented via an appropriate actuation of the further friction-locking shift elements contributing to the gear shift and/or a so-called engine override. During such an engine override, for example, the drive torque made available by the prime mover 2 is varied in the coasting condition as well as in the traction operation of the vehicle drive train 1 to the extent necessary for the synchronization. This also applies for the actuation of the friction-locking shift elements during the carrying-out of demanded traction or coasting shifts.

Figure 3A:
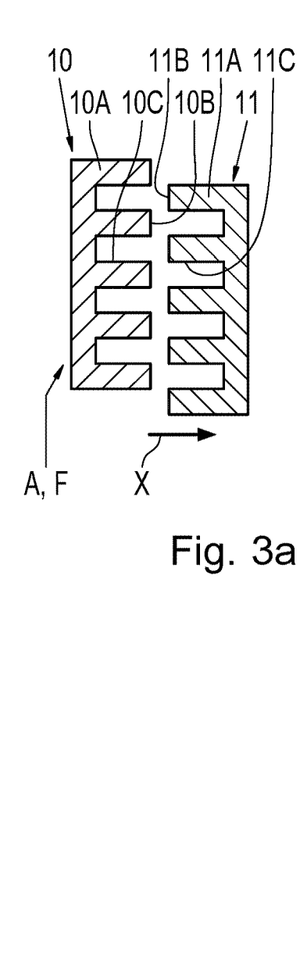
FIG. 3a through FIG. 3e each show various operating conditions of a form-locking shift element, which is represented in a highly diagrammatical manner, between a completely disengaged condition and a completely engaged condition.

FIG. 3a through FIG. 3e each show two shift-element halves 10, 11 of the form-locking shift element A through F in various operating conditions. FIG. 3a shows the completely disengaged operating condition of the form-locking shift element A through F, in which there is no positive engagement between the two shift-element halves 10 and 11 and in which the shift-element halves 10 and 11 are spaced apart from each other in the axial direction x.

The shift-element halves 10 and 11 include dog elements 10A and 11A, respectively. The dog elements 10A and 11A can be brought into engagement with one another in a form-locking manner depending on the particular current application via axial displacement of the shift-element half 10 and/or of the shift-element half 11 relative to the shift-element half 11 or the shift-element half 10, respectively, in order to be able to transmit a torque present at the form-locking shift element A or F to the desired extent.

In the presence of an appropriate demand to engage the form-locking shift element A or F, an appropriate actuation force is applied in the engagement direction at the particular displaceably designed shift-element half 10 or 11. As a result, the axial distance between the end faces 10B and 11B of the dog elements 10A and 11A, respectively, facing one another is increasingly reduced.

If the differential speed between the shift-element halves 10 and 11 is too great, the dog elements 10A and 11A cannot be brought into engagement with one another in a form-locking manner. In such a case, a rattling occurs, during which the dog elements 10A and 11A glide off of one another, at their facing end faces 10B and 11B, in the circumferential direction of the shift-element halves 10 and 11 to the extent shown in FIG. 3b. Such a rattling is undesirable, however, since it causes irreversible damage in the area of the dog elements 10A and 11A as the period of operation increases.

Figure 3B:
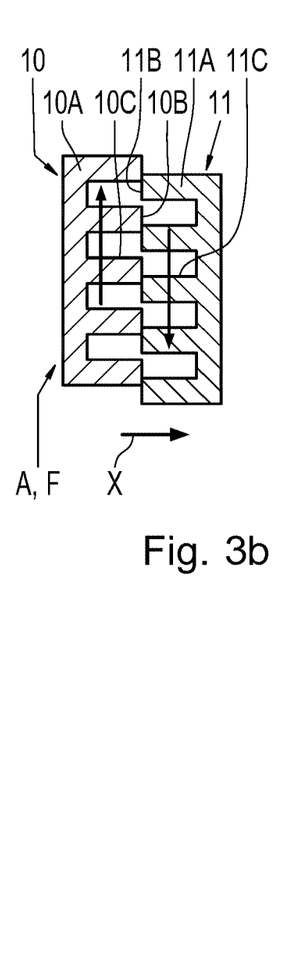

For this reason, the differential speed between the shift-element halves 10 and 11 is adjusted to values within a differential speed window, which encompasses the synchronous speed of the form-locking shift element A or F, via appropriate actuation of the particular friction-locking shift elements B through E contributing to the operating condition change in the transmission 3. Within this differential speed window, the dog elements 10A and 11A of the shift-element halves 10 and 11, respectively, can be brought into engagement with each other in a form-locking manner to the desired extent.

Figure 3C:
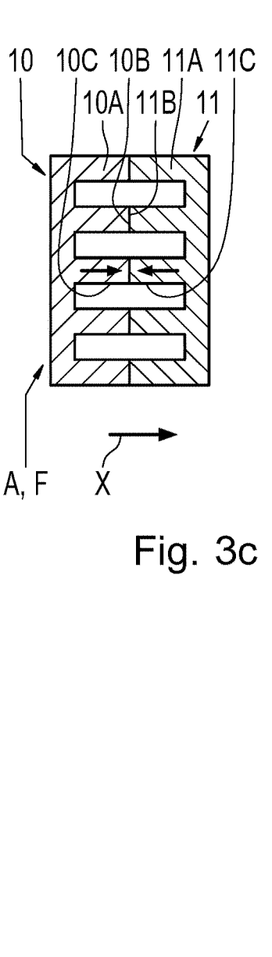

It should be noted, however, that the positive engagement to be established can be prevented by an out of mesh or tooth-on-tooth position between the shift-element halves 10 and 11. The out of mesh position, as represented in FIG. 3c, is characterized in that the dog elements 10A and 11A rest against one another in the area of their end faces 10B and 11B, respectively, and the differential speed between the shift-element halves 10 and 11 is zero. During such an out of mesh position of the form-locking shift element A or F, the static friction between the end faces 10B and 11B of the dog elements 10A and 11A, respectively, is so great that the torque present at the form-locking shift element A or F is transmitted via the form-locking shift element A or F without the out of mesh position being released or unmeshed.

In order to release the out of mesh position, it is advantageous if the actuation force acting on the form-locking shift element A or F in the engagement direction is reduced and/or the torque present at the form-locking shift element A or F is increased. The static friction in the area between the end faces 10B and 11B of the dog elements 10A and 11A, respectively, is lowered via the reduction of the engagement force. Simultaneously, by raising the torque present at the form-locking shift element A or F, the static friction between the end faces 10B and 11B is overcome and the differential speed between the shift-element halves 10 and 11 increases to an extent that enables the positive engagement between the dog elements 10A and 11A to be established.

Figure 3D:
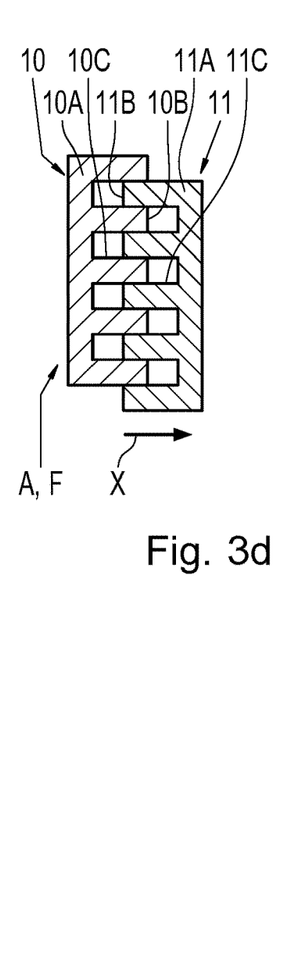

FIG. 3d shows an operating condition of the form-locking shift element A or F, in which a positive engagement between the shift-element halves 10 and 11 is present with a partial overlap of the dog elements 10A and 11A. Such an operating condition is present during a disengagement process as well as during an engagement process of the form-locking shift element A or F.

The torque acting on the shift element A or F and the coefficients of friction of the flanks 10C and 11C yield a static friction force, which acts between the flanks 10C, 11C. If the actuation force acting on the shift-element halves 10 and 11 in the disengagement direction or in the engagement direction of the form-locking shift element A or F is too low in relation to the static friction force between the flanks 10C and 11C of the dog elements 10A and 11A, respectively, flank jamming or flank clamping occurs. During such a flank jamming, the axial relative actuating movement between the shift-element halves 10 and 11 in the engagement direction or in the disengagement direction is zero, and so the demanded operating condition change of the form-locking shift element A or F does not take place. In order to prevent or release such a flank jamming, the actuation force acting on the shift element A or F, for example, is raised and/or the particular torque present at the form-locking shift element A or F is reduced to the extent necessary for this purpose.

Figure 3E:
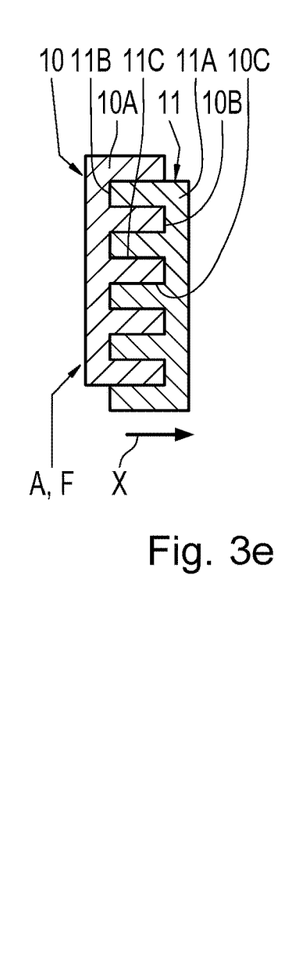

The completely engaged operating condition of the form-locking shift element A or F is represented in FIG. 3e, in which the full overlap between the dog elements 10A and 11A in the axial direction x is present.

FIG. 4a through FIG. 4f each show a representation of the form-locking shift element A or F corresponding to FIG. 3a. In the case of the shift element A or F, the dog elements 10A and 11A of the shift-element halves 10 and 11, respectively, which are arranged next to one another in the circumferential direction of the shift-element halves 10 and 11, each have a different length in the axial direction x. In the following, the longer dog elements are described in greater detail with reference to reference numbers 10A1 and 11A1 and the shorter dog elements are described in greater detail with reference to reference numbers 10A2 and 11A2.

This embodiment of the form-locking shift elements A and F offers the advantage that the positive engagement between the shift-element halves 10 and 11 can be established at higher differential speeds between the shift-element halves 10 and 11 than is the case with the embodiment of the form-locking shift elements A and F represented in FIG. 3a through FIG. 3e. In contrast thereto, the embodiment of the form-locking shift element A or F according to FIG. 4a through FIG. 4f is less robust against rattling as compared to the embodiment of the form-locking shift element A and F according to FIG. 3a through FIG. 3e.

The shift element A or F can have further operating conditions, due to the dog elements 10A1, 10A2 as well as 11A1 and 11A2 designed having different lengths, in addition to the operating conditions of the form-locking shift element A or F described with reference to FIG. 3a through FIG. 3e. The further operating conditions will be described in greater detail in the following description of FIG. 4a through FIG. 4f.

Figure 4A:
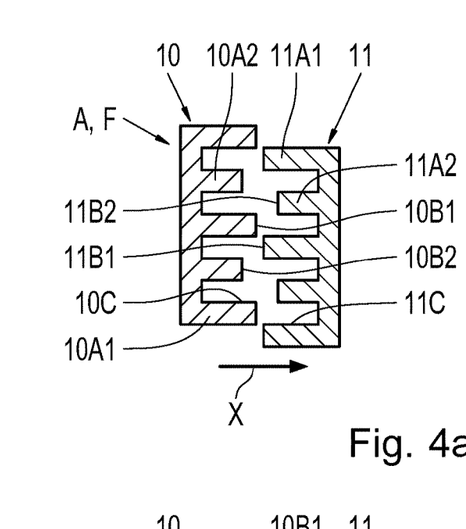
FIG. 4a through FIG. 4f each show representations corresponding to FIG. 3a of various operating conditions of a form-locking shift element, whose dog elements have different lengths.
Figure 4B:
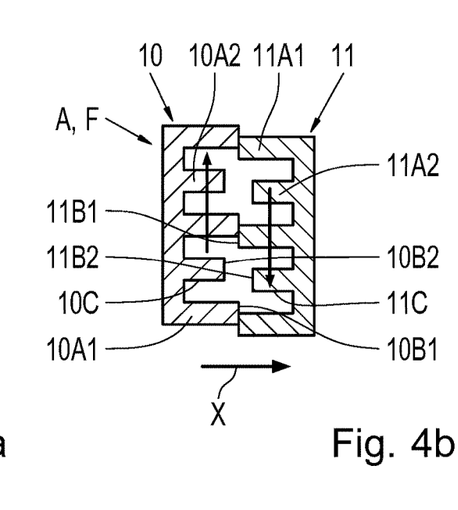

Initially, the completely disengaged operating condition of the shift element A or F is represented once again in FIG. 4a. FIG. 4b shows the operating condition of the form-locking shift element A or F during a rattling operation. During the rattling operation, the shift-element halves 10 and 11 glide off of one another, in the area of the end faces 10B1 and 11B1 of the longer dog elements 10A1 and 11A1, respectively, in the circumferential direction. Therefore, the positive engagement between the shift-element halves 10 and 11 cannot be established. This rattling operation can be prevented or ended, once again, to the extent described with reference to FIG. 3b by reducing the differential speed between the shift-element halves 10 and 11.

Figure 4C:
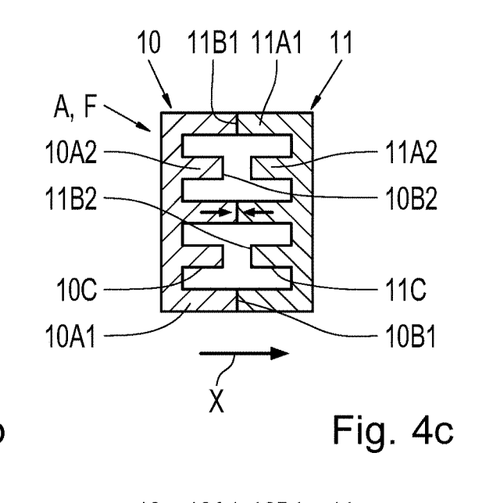
Figure 4D:
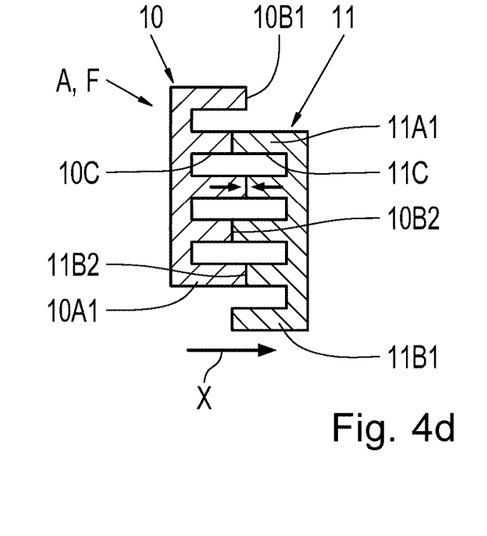

Moreover, FIG. 4c and FIG. 4d each show an out of mesh position, which prevents the establishment of the positive engagement between the shift-element halves 10 and 11. In the operating condition of the form-locking shift element A or F represented in FIG. 4c, the out of mesh position is between the end faces 10B1 and 11B1 of the longer dog elements 10A1 and 11A1, respectively. In contrast thereto, the out of mesh position between the shift-element halves 10 and 11 in the operating condition of the form-locking shift element A or F represented in FIG. 4d is between the end faces 11B1 of the longer dog elements 11A1 of the shift-element half 11 and the end faces 1062 of the shorter dog elements 10A2 of the shift-element half 10.

Regardless thereof, the particular out of mesh position between the shift-element halves 10 and 11 can be released or prevented in the way described with respect to FIG. 3c.

Figure 4E:
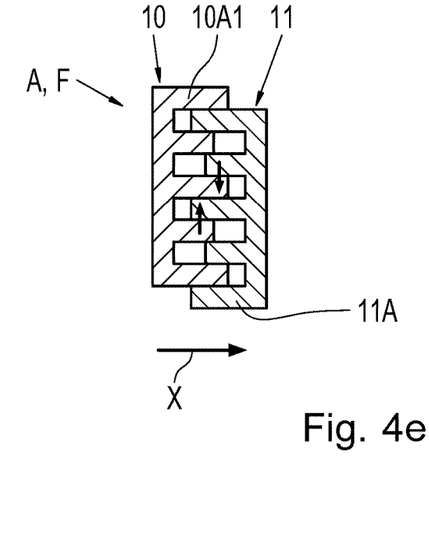

FIG. 4e shows an intermediate operating condition of the form-locking shift element A or F between the completely disengaged operating condition and the completely engaged operating condition of the form-locking shift element A or F. During this intermediate operating condition, the flank jamming—which is described in greater detail above—between the dog elements 10A1, 10A2 and the dog elements 11A1, 11A2, respectively, can occur. The flank jamming can be prevented or released to the extent described with reference to FIG. 3d in order to be able to disengage or engage the form-locking shift element A or F to the demanded extent.

Figure 4F:
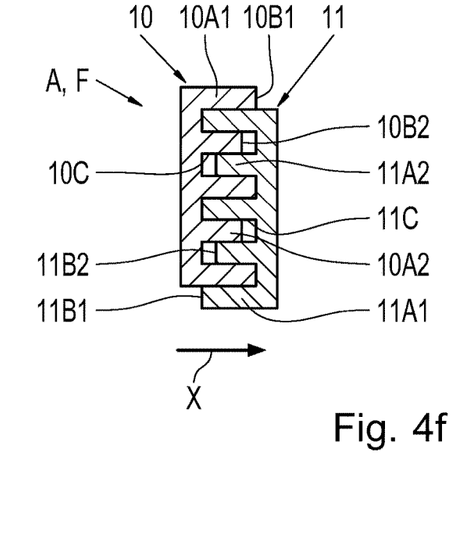

The completely engaged operating condition of the form-locking shift element A or F is represented in FIG. 4f.

Figure 5:
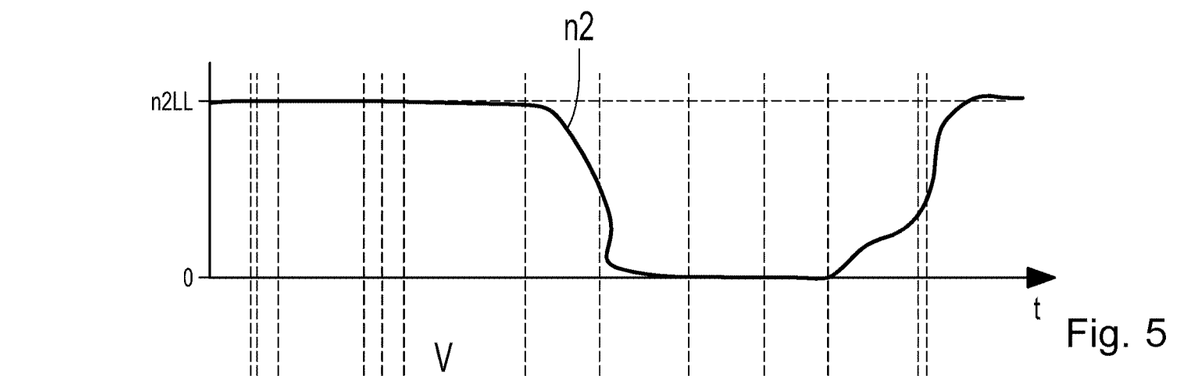
FIG. 5 shows a progression of a rotational speed of the prime mover of the vehicle drive train according to FIG. 1.

FIG. 5 shows a rotational speed n2 of the prime mover 2 of the vehicle drive train 1 according to FIG. 1 over the time t. At a point in time T1, the rotational speed n2 has a rotational speed level of an idling speed n2LL. At a point in time T2, an engine start-stop function outputs a demand to shut off the prime mover 2. For this reason, the rotational speed n2 of the prime mover 2 decreases, starting from the idling speed n2LL, in the direction of zero. In the present case, the rotational speed n2 of the prime mover 2 at the point in time T3 is zero.

The transmission 3 of the vehicle drive train 1 includes a hydraulic pump, which provides the hydraulic pressure for the actuation of the shift elements A through F. The hydraulic pump is coupled to the transmission input shaft 5 in the present case, so that the hydraulic pump is driven by the prime mover 2. This means, the delivery capacity of the hydraulic pump starting at the point in time T2 increasingly decreases and, at the point in time T3, is essentially zero.

Figure 6:
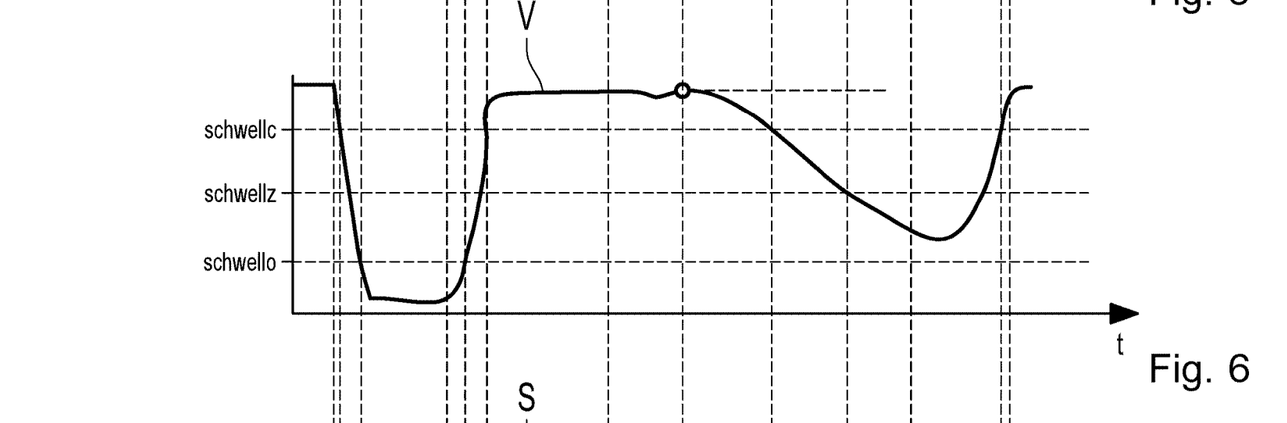

FIG. 6 shows a progression of a signal of the sensor, which is associated with the form-locking shift element A or F. The signal of the sensor corresponds to a position of the shift-element half 10 of the form-locking shift element A or F.

Figure 7:
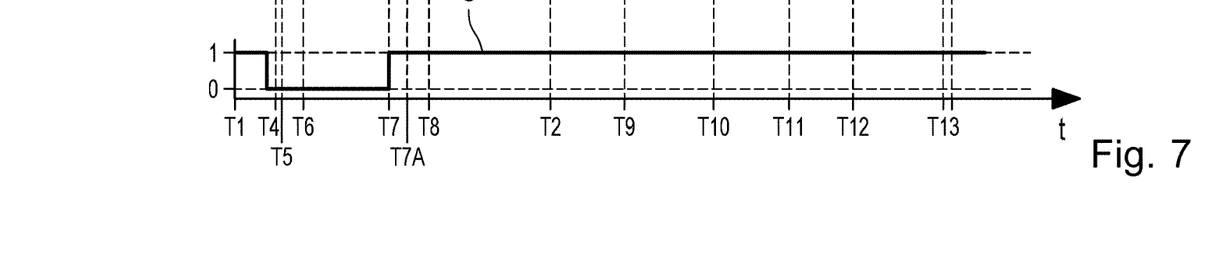
FIG. 7 shows a status progression of a demand for an operating condition of the form-locking shift element.

Additionally, FIG. 7 shows a status progression S of the form-locking shift element A or F. The status progression S has the value one if the form-locking shift element A or F is to be transferred into its engaged operating condition. If there is an appropriate demand to disengage the form-locking shift element A or F, the status progression S has the value zero.

At the point in time T1, a demand is present to engage the form-locking shift element A or F, which is why the status progression S has the value one. At a point in time T4, the status progression S changes from the value one to the value zero, which corresponds to a change of the demand in the direction of the disengaged operating condition of the form-locking shift element A or F. Due to the demand at the point in time T4, the shift-element half 10 is moved, starting at the point in time T5, out of the end position corresponding to the engaged operating condition of the shift element A or F into its further end position to the extent represented in FIG. 6. The further end position corresponds to the disengaged operating condition of the shift element A or F. For this purpose, the hydraulic pressure of the hydraulic pump is applied at the shift-element half 10, to the appropriate extent, in the disengagement direction of the shift element A or F.

At a point in time T6, the progression of the signal of the sensor falls below a threshold value schwello. For this reason, the disengaged operating condition of the shift element A or F is detected at the point in time T6. At a point in time T7, the status progression S changes from the value zero to the value one, since a demand to engage the form-locking shift element A or F arises at the point in time T7. As a result, the progression of the signal V of the sensor rises. At a point in time T8, the progression of the signal V of the sensor exceeds a further threshold value schwellc. On the basis of the further threshold value schwellc having been exceeded, it is detected that the form-locking shift element A or F is engaged.

Since the prime mover 2 is transferred into the switched-off operating condition to the above-described extent at the point in time T2 and, as a result, the hydraulic pressure of the hydraulic pump drops, the form-locking shift element A or F begins to disengage at a point in time T9, which is located between the points in time T2 and T3 in the present case. At a point in time T10 following the point in time T3, the progression of the signal V of the sensor falls below the further threshold value schwellc. Thereafter, the shift-element half 10 moves in the direction of the end position that corresponds to the disengaged condition of the shift element A or F. Associated therewith, the progression of the signal V of the sensor decreases in the direction of the lower threshold value schwello, below which it can be reliably assumed that the positive engagement between the shift-element halves 10 and 11 is no longer present. At a point in time T11 following the point in time T10, the progression of the signal V of the sensor falls below an intermediate threshold value schwellz. On the basis of the intermediate threshold value schwellz having been fallen below, it is detected that the form-locking shift element A or F is automatically carrying out an operating condition change starting from the completely engaged operating condition in the direction of the completely disengaged operating condition, to an undesired extent. The intermediate threshold value schwellz corresponds to a position value of the shift-element half 10, at which a positive engagement still exists between the shift-element halves 10 and 11, and the shift element A or F has a so-called partially overlapped operating condition.

When the intermediate threshold value schwellz is fallen below at the point in time T11, a demand arises, in the present case, to switch on the prime mover 2. Therefore, the delivery capacity of the hydraulic pump is to be raised and hydraulic pressure is to be applied to the form-locking shift element A or F to the necessary extent in the direction of the engaged operating condition of the shift element A or F. Due to the switch-on demand of the prime mover 2, the rotational speed n2 increases, starting at a point in time T12, in the direction of the idling speed n2LL to the extent represented in FIG. 5. As a result of the increase of the rotational speed n2 and the associated increase of the hydraulic pressure of the hydraulic pump, the shift-element half 10 is moved according to the progression of the signal V of the sensor in the direction of the engaged operating condition of the form-locking shift element A or F. At a point in time T13, the progression of the signal V of the sensor exceeds the further threshold value schwellc, whereby the engaged operating condition of the form-locking shift element A or F is detected.

At the point in time TSA, the current position of the shift-element half 10 is detected with the aid of the sensor and is stored as a specified end-position value. When the further threshold value schwellc is fallen below, the detection of the current position of the shift-element half 10 is terminated. Starting at the point in time T6, at which the progression of the signal V of the sensor falls below the threshold value schwello, the current position of the shift-element half 10 is detected and is stored as a specified end-position value. This approach is carried out until the point in time T7A has been reached, at which the progression of the signal V of the sensor exceeds the threshold value schwello.

The current position of the shift-element half 10 is first stored as a specified end-position value for the case in which the progression of the signal V of the sensor exceeds the further threshold value schwellc.

Starting at the point in time T9, at which the hydraulic pressure is less than a threshold value, the last specified end-position value determined before the point in time T9 is frozen and utilized as a reference value. Additionally, starting at the point in time T9, a deviation is determined between the reference value and the current position of the shift-element half 10. At the point in time T11, the deviation between the current position of the shift-element half 10 and the specified end-position value is greater than the intermediate threshold value schwellz, which is why the hydraulic pressure of the hydraulic pump is increased by switching on the prime mover 2. Therefore, the undesirable, automatic operating condition change of the form-locking shift element A or F starting from the engaged operating condition in the direction of the disengaged operating condition is prevented in an easy way.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 vehicle drive train
2 prime mover
3 transmission
4 driven end
5 transmission input shaft
6 transmission output shaft
7 torsion damper
8 hydrodynamic torque converter
9 torque converter lockup clutch
10, 11 shift-element half
10A, 10A1, 10A2 dog element
11A, 11A1, 11A2 dog element
10B, 10B1, 1062 end face of the dog element
10C flank of the dog element
11B, 11B1, 1162 end face of the dog element
11C flank of the dog element
"1" to "9" transmission ratio for forward driving
"R" transmission ratio for travel in reverse
A to F shift element
n2 rotational speed of the prime mover
n2LL idling speed of the prime mover
P1 to P4 planetary gear set
S status progression
schwellc further threshold value
schwello threshold value
schwellz intermediate threshold value
t time
T1 to T13 discrete point in time
V progression of the signal of the sensor

The invention claimed is:

1. A method for operating a transmission (3) that comprises a hydraulic pump and at least one form-locking shift element (A, F), the hydraulic pump drivable on a transmission-input end, the at least one form-locking shift element (A, F) comprises two shift-element halves (10, 11) that are engageable with each other in a form-locking manner, at least one of the shift-element halves (10) is displaceable between a first end position, which corresponds to an engaged operating condition of the form-locking shift element (A, F), and a second end position, which corresponds to a disengaged operating condition of the form-locking shift element (A, F), by a hydraulic pressure of the hydraulic pump, wherein a current position of one of the shift-element halves (10) is monitored with a sensor, the method comprising:

detecting the current position of the one of the shift-element halves (10) and storing the current position as a specified end-position value when the one of the shift-element halves (10) is located in one of the first and second end positions, the hydraulic pump is driven, and the shift-element half is actuated by the hydraulic pressure towards a demanded end position;

when the hydraulic pressure is less than a threshold value, determining a deviation between the current position of the one of the shift-element halves and the specified end-position value; and increasing the hydraulic pressure when the deviation is greater than a threshold value.

2. The method of claim 1, wherein increasing the hydraulic pressure comprises increasing the hydraulic pressure by raising a drive torque of the hydraulic pump.

3. The method of claim 2, further comprising:

determining whether the hydraulic pressure is greater than the threshold value after raising the drive torque of the hydraulic pump, whether a differential speed between the two shift-element halves (10, 11) is zero, and whether the one of the shift-element halves is actuated towards the demanded end position; and applying the hydraulic pressure to the one of the shift-element halves when the hydraulic pressure is greater than the threshold value after raising the drive torque of the hydraulic pump, the differential speed between the two shift-element halves (10, 11) is zero, and the one of the shift-element halves is actuated towards the demanded end position.

4. The method of claim 3, further comprising guiding the differential speed between the two shift-element halves (10, 11) to within a differential speed range, positive engagement between the two shift-element halves (10, 11) establishable at differential speeds within the differential speed range when the differential speed is greater than a limiting value upon determining that the hydraulic pressure is greater than the threshold value.

5. The method of claim 1, further comprising one or both of reducing the hydraulic pressure and increasing a torque present at the shift element (A, F) when the hydraulic pressure is greater than the threshold value and a tooth-on-tooth condition is detected.

6. The method of claim 1, further comprising one or both of increasing the hydraulic pressure and reducing a torque present at the shift element (A, F) when the hydraulic pressure is greater than the threshold value and a flank clamping condition is detected.

7. The method of claim 1, further comprising interrupting a power flow in the transmission (3) when the one of the shift-element halves (10) is not detected in the demanded end position after a predefined time period has elapsed.

8. A control unit programmed to carry out the method of claim 1 on a control side.

9. A computer program comprising program code stored on a non-transitory computer-readable medium with software instructions to carry out the method of claim 1 when executed on a control unit.

10. A control unit for operating a transmission (3) that comprises a hydraulic pump and at least one form-locking shift element (A, F), the hydraulic pump drivable on a transmission-input end, the at least one form-locking shift element (A, F) comprises two shift-element halves (10, 11) that are engageable with each other in a form-locking manner, at least one of the shift-element halves (10) is displaceable between a first end position, which corresponds to an engaged operating condition of the form-locking shift element (A, F), and a second end position, which corresponds to a disengaged operating condition of the form-locking shift element (A, F), by a hydraulic pressure of the hydraulic pump, wherein a current position of one of the shift-element halves (10) is monitored with a sensor, the control unit configured to:

detect the current position of the one of the shift-element halves (10) and storing the current position as a specified end-position value when the one of the shift-element halves (10) is located in one of the first and second end positions, the hydraulic pump is driven, and the shift-element half is actuated by the hydraulic pressure towards a demanded end position;

when the hydraulic pressure is less than a threshold value, determine a deviation between the current position of the one of the shift-element halves and the specified end-position value; and increase the hydraulic pressure when the deviation is greater than a threshold value.

* * * * *